Figure 1:
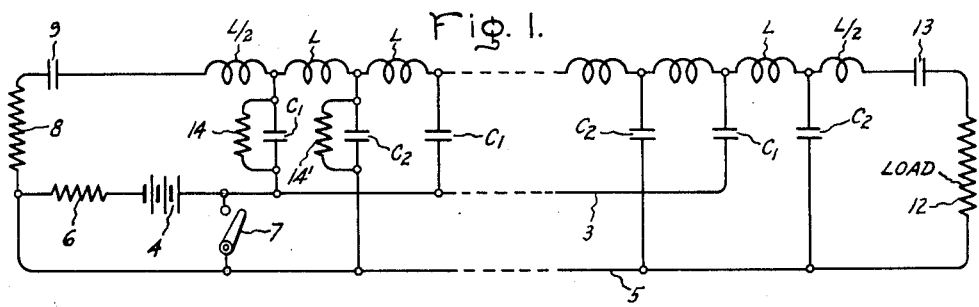

May 14, 1957  R. W. SAMSEL  2,792,508
PULSE GENERATOR
Filed Aug. 24, 1953  3 Sheets-Sheet 1

Inventor:
Richard W. Samsel,
by Merton D. Moore
His Attorney.

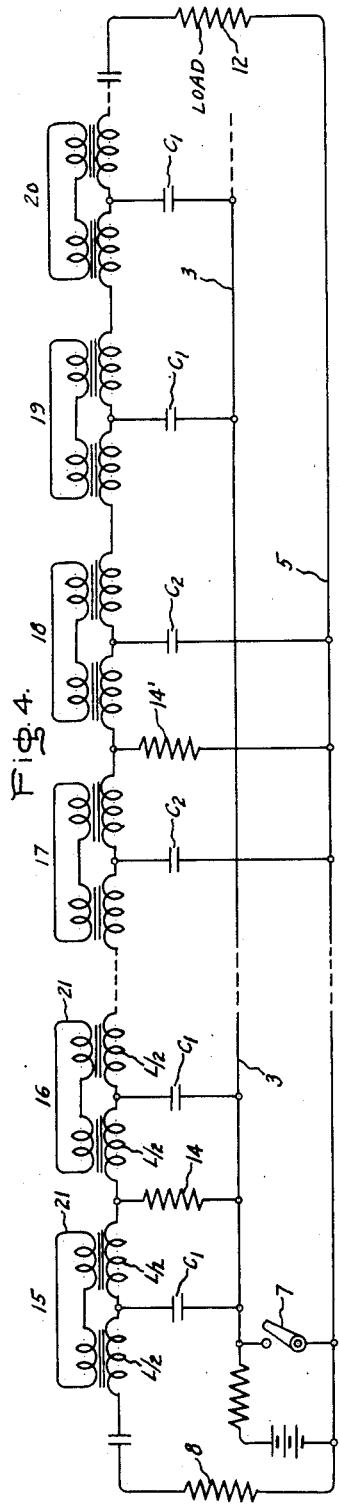

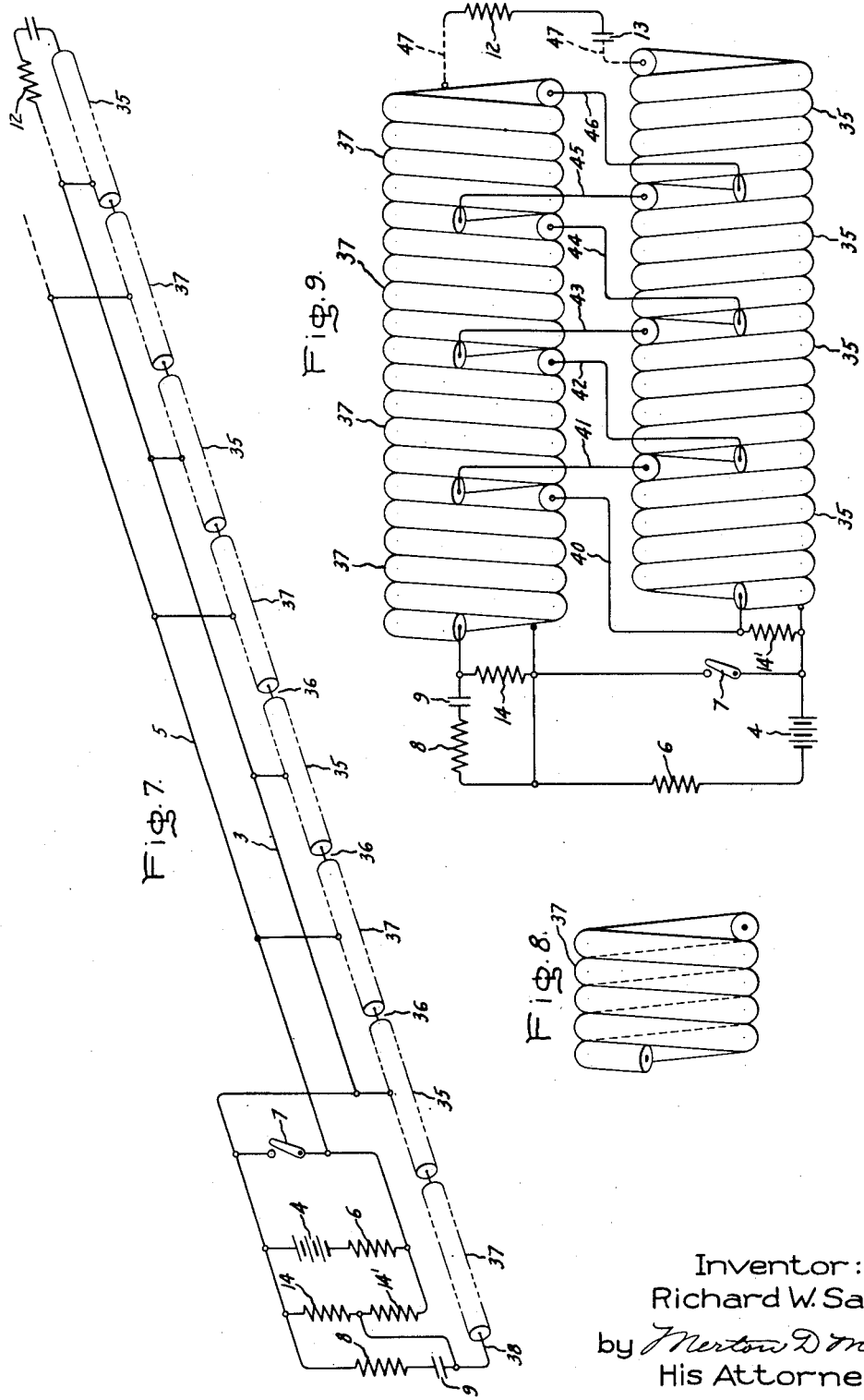

United States Patent Office 2,792,508
Patented May 14, 1957

2,792,508

PULSE GENERATOR

Richard W. Samsel, Scotia, N. Y., assignor to General Electric Company, a corporation of New York Application August 24, 1953, Serial No. 376,065

16 Claims. (Cl. 307—106)

My invention relates to pulse generators and particularly to pulse generators operating without the use of electron discharge devices, transistors, or other translation devices.

An object of my invention is to provide such a pulse generator in which, in response to an operation by the operator, such as the closing of a switch, or key, an oscillatory pulse of definite predetermined character as to frequency of oscillation, intensity, and duration may be produced in a load and in which this result is produced without the use of electron discharge devices, transistors, or other translation or timing devices.

A further object of my invention is to provide such a pulse generator capable of producing pulses of extremely high intensity.

Another object of my invention is to provide such a pulse generator in which the pulse generated is of substantially uniform intensity throughout its duration and abruptly terminates.

A further object of my invention is to provide such a pulse generation which is of rugged and reliable construction and has the permanence of its characteristics that is characteristic of simple transmission lines and filters.

My invention finds application in pulse echo apparatus, for example, such as in radar and sonar. In the latter application an oscillatory pulse may be supplied, on the closing of a key, to a transducer which converts the pulse to a compressional wave pulse in water about the vessel on which the equipment may be carried. This compressional wave pulse may travel outward through the water to a reflecting surface such as another vessel, or the bottom, as in depth sounding, and be reflected back to the vessel, the returning wave being then picked up, as by the transducer, and supplied to suitable indication apparatus such as a cathode ray tube which may be used in ways that are now customary to indicate the distance to the reflecting surface.

Since such apparatus is carried on board ship, it is desired that it be of the most rugged and reliable construction.

Since the range of the apparatus depends on the intensity of the pulses, it is desired that the apparatus produce pulses of extremely high intensity.

In carrying my invention into effect, I provide means whereby a multi-section transmission line, which may be in the form of a well-known low pass, or band pass, filter, has the shunt capacitances of alternate sections, or alternate groups of sections, charged with potentials of opposite polarity. Means is then provided abruptly to discharge all of these capacitances through the adjacent series inductances. In this way an oscillatory wave is set up in the line having a frequency determined by the constants of the line sections and groups of sections. This wave travels along the line and dissipates itself in any impedance which may be connected across either, or both ends, of the line. Preferably such an impedance, which matches the impedance of the line, is connected across each end of the line and one or both of such impedances serves as a load. The oscillatory pulse produced in such load impedance has a duration determined by the length of the line, and by proper construction of the line may have substantially constant intensity throughout its duration. The pulse then abruptly terminates.

Figure 2:
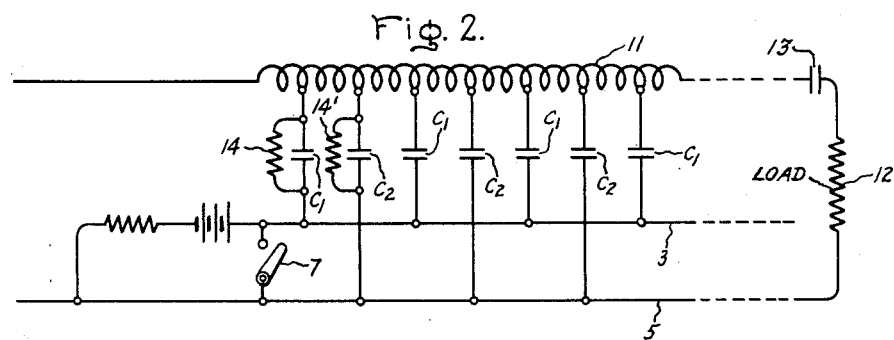
Figure 3:
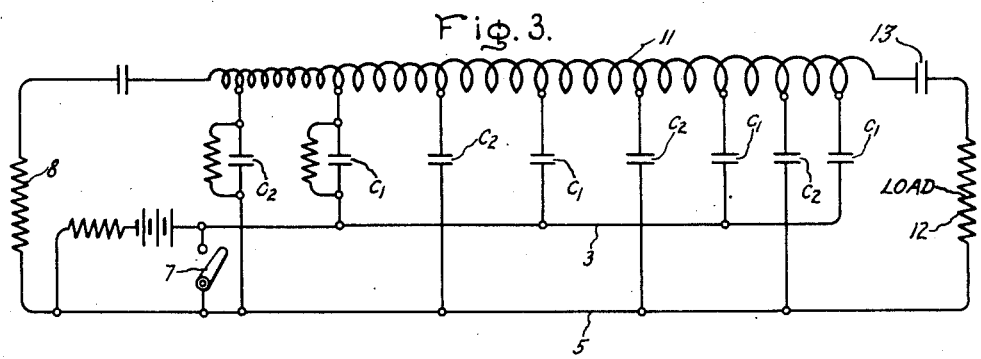
Figure 5:
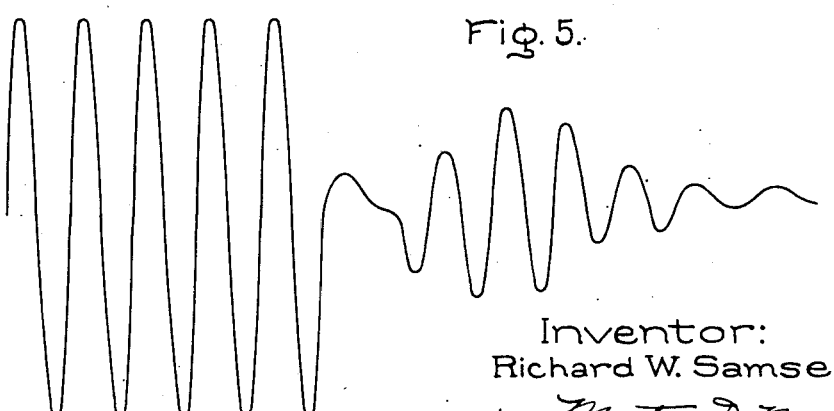

The novel features which I believe to be characteristic of my invention are set forth with particularity in the appended claims. My invention itself, both as to its organization and method of operation together with further objects and advantages thereof, may best be understood by reference to the following description taken in connection with the accompanying drawing in which Fig. 1 represents an embodiment of my invention; Fig. 2 represents a similar embodiment terminated at only one end; Fig. 3 represents a further embodiment especially adapted for producing long pulses of uniform intensity throughout the duration thereof; Fig. 4 shows a further embodiment of my invention employing low pass filter sections of the M derived type; Fig. 5 shows a pulse characteristic of that produced by the arrangement of Fig. 4 and which shows the effect of improper termination; Fig. 6 shows a form of my invention using filter sections of the $\pi$ type; Figs. 7, 8, and 9 illustrate my invention using concentric line cable, and Figs. 10, 11, and 12 represent line terminations.

Referring to Fig. 1, I have shown my invention as comprising a transmission line made up of a series of filter sections each comprising a series inductance and a shunt capacitance. Each capacitance has one terminal connected in one point midway of the inductance of the respective section. Thus the first inductance shown at the left in Fig. 1 is indicated as $$\frac{L}{2}$$

and the adjacent inductance which serves in two sections of the line is indicated as L. The terminating indictances have one half the inductance of the remaining inductances of the line. Thus each of the other inductances along the length of the line is indicated as L, except the last which is again indicated as $$\frac{L}{2}$$

The alternate capacitances along the length of the line are designated $C_1$ and intermediate capacitances are designated $C_2$. The capacitances $C_1$ have their lower electrodes, as shown in the drawing, all connected to a conductor 3 and to one terminal of a source of unidirectional electromotive force 4. The capacitances $C_2$ intermediate the capacitances $C_1$ have their lower terminals connected to conductor 5 and through resistance 6 to the opposite terminal of the source of electromotive force.

A key 7 is connected between conductors 3 and 5 so that when closed these two conductors are connected together and the line is then the normal T section low pass filter. The line is terminated at the left end, as shown in Fig. 1, by an impedance, or resistance 8, which is connected across the line through a capacitance 9 and the opposite end of the line is terminated by an impedance 12, which is connected across the line through a capacitor 13. These impedances are of such value as to match the impedances of the line so that any oscillatory wave traveling in the line toward the impedances is dissipated in the impedances and is not reflected into the line, just as would occur if the line were electrically of infinite length.

In operation, the switch 7 is normally open and all of the capacitors $C_1$ are then connected in series with all of the capacitors $C_2$ across the source of the unidirectional electromotive force 4 through the inductance of the respective sections of the line. Therefore, all of the capacitors $C_1$ are charged with a polarity such that their upper electrodes, as shown on the drawing, are negative with respect to their lower electrodes and all of the capacitors $C_2$ are charged with their upper electrodes positive with respect to their lower electrodes, as shown on the drawing. One of the capacitors $C_1$ is shunted by a resistance 14 and similarly one of the capacitors $C_2$ is shunted by a resistance 14'. These two resistances are of equal value and the potential of source 4 divides equally between them. Therefore, all of the capacitors $C_1$ and $C_2$ are charged to equal potentials. Preferably the number of capacitors $C_1$ equals the number of capacitors $C_2$ and the line is symmetrical.

If now switch 7 be closed to short circuit together conductors 3 and 5, the lower electrodes of all of the capacitors $C_1$ and $C_2$ are at the same potential with the result that the points between adjacent inductances of the line are then charged alternately positive and negative along the length of the line, as indicated by the plus and minus signs between the inductances on thte drawing. Thus the point between the first two inductances at the left is at a negative potential, the point between the second and third is at a positive potential, the point between the third and fourth is again at a negative potential, etc. along the entire line. Thus a wave exists along the length of the line.

These potentials, upon closing thte key 7, immediately tend to equalize themselves thereby setting up oscillations in each section of the line, i. e. the capacitors discharge through the adjacent inductances. These oscillations travel in each direction in the line and are dissipated in the impedances 8 and 12. Since these impedances match the impedance of the line, there are no reflections and the oscillatory pulses which result in each of these pulses have a duration equal to the electrical length of the line. Of course, the frequency of the oscillations making up each pulse is determined by the inductance L and capacitance C of each section of the line.

Either, or both, of the impedances 8 or 12 may comprise a load impedance of the line and the oscillatory pulses which appear therein may be supplied for any desired purpose, as, for example, to the transducer of submarine signaling apparatus. The pulses produced in this way employing properly constructed lines may be of substantially rectangular form, i. e. be of uniform intensity throughout their duration. It has been found that such pulses may be produced in this way having extremely high energy content as compared with oscillations produced over a similar interval by equipments of equal size, or space requirement, utilizing electron discharge oscillators or transistors. At the same time, the equipment constructed as shown in Fig. 1 has the simplicity, ruggedness, and permanence of its operating characteristic of the structure of transmission lines and filters.

Substantially no pulse is produced on opening of switch 7 owing to the effect of resistance 6. This resistance is of such magnitude that the charging of the capacitors $C_1$ and $C_2$ takes place without exciting the line into oscillations. It should not be greater, however, than is compatible with the production of pulses at a desired repetition rate.

The apparatus of Fig. 2 is similar to that of Fig. 1 but differs in that the impedance 8 is omitted. The line is terminated only at one end in the impedance 12, comprising the load, and which may match the impedance of the line. Oscillations set up in the line by closing of key 7 and which travel toward the left may be reflected from the open left end of the line and, therefore, travel back to the right through the line to be dissipated in the load 12. This doubles the duration of the pulse owing to the fact that certain of the oscillations travel in the line a distance double the length of the line. Some attenuation may occur with the result that the pulse produced on load 12 may diminish in intensity to some extent during the duration of the pulse. Where a pulse of strictly uniform strength is desired, such a pulse may be supplied through a suitable limiter to limit oscillation passed to the intensity of the final oscillations of the pulse.

Fig. 2 differs also from Fig. 1 in that the inductance of the line is shown as a single continuous inductance 11. Of course, the line may be constructed to employ such a continuous inductance, but normally it will comprise a series of concentrated inductances and may employ coils wound on magnetic cores, such as those of ferrites, and the different sections of the line may have any of the usual low pass, or band pass, filter configurations such as the T section, $\pi$ section, constant K, and M derived, etc.

Fig. 3 differs from the arrangement of Fig. 2 in that the line is terminated at both ends in impedances 8 and 12, respectively, and in that inductance 11 is shown as tapered from one end to the other, i. e. the series inductances of sections of the line nearer the impedance 12 are progressively larger along the length of the line. Similarly, the capacitances are progressively smaller along the length of the line in the same direction. This proportioning of the inductances and capacitances improves the uniformity of the strength of the oscillations on load 12 during the duration of the pulses. Oscillations set up in the line and which travel toward the left are dissipated in resistance 8 and need not be considered. Those which are set up in the line and travel toward the right dissipate in resistance 12 and set up oscillatory pulses in resistance 12. The taper of the line and the relation of the inductance to the capacitors of successive sections is such that the frequency of oscillations set up in the different sections is the same but that the attenuation of oscillations generated in the left of the line as it travels therein is so related to the intensity of such oscillations that such oscillations appear upon load 12 with substantially the same intensity as oscillations generated at the right end of the line and which appear on load 12.

In other words, the larger capacitances at the left portion of the line contain greater charges which, upon closure of key 7, discharge through smaller inductances producing oscillations of intensity greater than those produced by discharge of the smaller capacitances at the right end of the line through the larger inductances at the right end. In this way all oscillations originating in any section of the line arrive at load resistance 12 with substantially the same intensity, notwithstanding the attenuation of the line.

Fig. 4 shows a further embodiment of my invention comprising sections 15, 16, 17, 18, 19, 20, etc. but in which the sections are connected in groups of two or more, i. e. sections 15 and 16 comprise one group, sections 17 and 18 comprise a second group, sections 19 and 20 a third, etc. All of the sections are of the T type having their shunt capacitances connected at the intermediate point of the series inductances. The capacitances $C_1$ of sections 15 and 16 are connected to conductor 3 and the capacitances $C_2$ of sections 17 and 18 are connected to conductor 5. Similarly, the next sections 19 and 20 have their shunt capacitances $C_1$ connected to conductor 3, etc. throughout the length of the line. While only six sections are shown, as many sections as may be required, as, for example, forty or more, may be used and preferably the same number of sections should be connected to conductor 3 as to conductor 5.

The sections 15, 16, 17, 18, 19, and 20 are also shown as having mutual inductances represented by the loops 21 between the opposite portions $$\frac{L}{2}$$

of the respective inductances so as to derive the advantages of an M derived filter having an M greater than one. The resistances 14 and 14', which correspond to resistances 14 and 14' of Fig. 1, are shown connected at points between the different inductances L but in shunt for unidirectional currents to the respective capacitors $C_1$ and $C_2$ and they thus serve the same purpose as do the corresponding resistances of Fig. 1.

A line constructed as shown in Fig. 4 having twenty sections was found to produce on the load impedance 12 upon each closing of the switch an oscillatory pulse which appeared on a cathode ray oscillograph as shown in Fig. 5.

It will be seen from inspection of the wave of Fig. 5 that the first five complete cycles of the wave are of substantially uniform intensity as is desired. These oscillations are those which originate in the line and travel to the load impedance and are dissipated in the load.

The balance of the wave shown in Fig. 5 varies in intensity from cycle to cycle as illustrated. This portion of the wave is undesired and is the result of reflections due to improper matching of impedance 8 to the impedance of the line. This portion of the wave may be completely eliminated by properly terminating the line.

In a line of the construction shown in Fig. 4 the frequency of the oscillations produced is not only dependent on the inductance and capacitance of the sections but is also dependent on the number of sections in the different groups. By increasing the number of sections in the groups the frequency of the oscillations is reduced and the form of the oscillation is distorted from a sine wave and it becomes more nearly rectangular attaining the rectangular form when the number of sections is infinite, i. e. when the inductances and capacitances become uniformly distributed along the line.

Fig. 6 shows a line in which the filter sections are of $\pi$ form rather than of T form. Also in Fig. 6 an inductance 8' and 12' is connected in series with each of the terminating resistances 8 and 12. These inductances are proportioned to tune out or neutralize the reactance of the blocking capacitors 9 and 13 in series with these terminating resistances.

Fig. 7 shows a form of my invention utilizing the distributed constants of a uniform line such as a shielded cable. The cable may be of any suitable type and may employ either solid, liquid, or gaseous dielectric. As shown in Fig. 7, it may comprise a shielded coaxial cable in which the shield is broken at points 36 along the line, alternate parts 35 of the shield between these points 36 being connected to conductor 3 and the intermediate parts of the shield being connected to conductor 5. The conductor 5 is connected to the negative terminal of the source 4 through resistance 6, whereas conductor 3 is connected to the positive terminal of the source. The inductance of the line comprises the inductance of the inner conductor 38 of the cable and the capacitance of the line comprises the capacitance between the shield and the inner conductor.

The figure shows the coaxial line broken into eight parts but, of course, it may comprise many more parts as represented by the dotted portions of lines 3 and 5 at the right. Of course, the line is terminated in the impedances 8 and 12 as before.

In order to reduce the physical space requirements of the pulse generator employing such a line and to reduce the length of the connections between different parts of the cable, each of the parts 35, 37 of the line may be wound into a coil as shown in Fig. 8 and, as indicated in Fig. 9, the coils of parts 37 may be arranged end-to-end with the shields in direct electrical contact with each other, and the coils of parts 35 may similarly be arranged end-to-end as shown in Fig. 9 with the shields thereof in direct electrical contact with each other. The shields of the coils of parts 37 are insulated from the shields of parts 35. The left end of the inner conductor 38 of the line is connected through capacitor 9 and resistance 8 to the shield of parts 37 which replace the conductor 5 of Fig. 1. Similarly, the right end of inner conductor 38 of the line is connected through capacitance 13 and resistance 12 to the shield of parts 37. The shield of parts 35, which replace conductor 3 of Fig. 1, is connected to the positive terminal of source 4 and through resistance 6 of the shield of parts 37. Switch 7 is then connected between the shields of parts 35 and 37 so that when closed all of these shields are at the same potential.

The circuit of the inner conductor of the line can then be traced through capacitor 9, and the left-hand part 37, conductor 40, inner conductor of the left-hand part 35, conductor 41, inner conductor of the second part 37, conductor 42, inner conductor of the second part 35, conductor 43, inner conductor of the third part 37, conductor 44, inner conductor of the third part 35, conductor 45, inner conductor of the last illustrated part 37, conductor 46, and thence through the last illustrated part 35 to capacitor 13 and terminating impedance 12. Of course, as many more parts as is desired may be employed as indicated by the dotted lines 47.

The parts 37 and 35 are so positioned relative to each other that conductors 40 to 47 inclusive are of as short length as possible, and similarly the connections from the shields to switch 7 and load resistance 8 are as short as possible.

As previously indicated, the oscillations produced by the system of Fig. 9 are of rectangular form owing to the use of the distributed constants of the uniform line. The duration of the positive portion of each oscillation is dependent on the length of the cable comprising the part 35 in which it is generated. Similarly, the duration of the negative portion of each oscillation is dependent upon the length of the cable of the part 37 in which it is generated. These positive and negative portions of the rectangular oscillations need not be of the same length but may be of any length. This permits the design of a system such as that shown in Fig. 9 in which, in response to closing of key 7, a code signal comprising dots and dashes may be produced in load resistance 12 and transmitted therefrom in a desired signaling channel. For example, if the letter A of the Morse code, which comprises a dot followed by a dash, were to be produced the part 35 at the right in Fig. 9 would have a length proportioned in accord with the length of the dot, the part 37 at the right in Fig. 9 would be proportioned in accord with the length of the interval between the dot and dash, and the part 35 second from the right in Fig. 9 would have a length proportioned in accord with the length of the dash. The balance of the cable would not be used. Of course, more complicated codes might be produced by using more parts of the cable properly proportioned.

In all of the forms of the invention thus far described the terminating impedances are illustrated as comprising a blocking capacitor in series with a resistance. It may be desirable to tune out the reactance of such capacitor by inserting an inductance in series with it of equal reactance.

Fig. 10 shows a terminating resistance 51 of value to match the impedance of the line having one electrode connected to the end of the final inductance of the line and its other electrode connected through a blocking capacitor 52 and inductance 53 to conductor 3 and also connected through blocking capacitor 54 and inductance 55 to conductor 5. Inductances 53 and 55 are proportioned to tune out the reactance of the respective blocking capacitors 52 and 54.

The arrangement of Fig. 11 differs from that of Fig. 10 in that the resistance 51 is replaced by individual resistances 56 and 57 of twice the value of resistance 51 and each of which is in series with the corresponding elements 52, 53 and 54, 55.

Fig. 12 illustrates an arrangement in which a single terminating resistance 61 in series with a blocking capacitor 62 may terminate both ends of the line. This eliminates one resistance and one capacitor and provides an arrangement in which all of the energy of the oscillations produced is dissipated usefully in a single load resistance 61. The rectangle 63 represents all remaining portions of the network. In this arrangement the network must be so designed that oscillations emanating from the two ends are in the same phase and in aiding relation in resistance 61.

While I have shown particular embodiments of my invention, it will, of course, be understood that many modifications both in the circuit arrangements and instrumentalities may be made and I contemplate by the appended claims to cover any such modifications as fall within the true spirit and scope of my invention.

What I claim as new and desire to secure by Letters Patent of the United States is:

1. A pulse generator comprising a transmission line having series inductance and shunt capacitance, said capacitance comprising a plurality of capacitances distributed along the length of said inductance, means to charge alternate of said capacitances with like polarity and the intermediate capacitances with opposite polarity, and means simultaneously to discharge all of said capacitances through the sections of said inductance adjacent thereto.

2. A pulse generator comprising a transmission line having series inductance and shunt capacitance, said capacitance comprising a plurality of capacitances distributed along the length of said inductance, means to charge alternate of said capacitances with like polarity and the intermediate capacitances with opposite polarity, and means simultaneously to connect all of said alternate capacitances in series aiding relation with said intermediate capacitances across adjacent sections of said inductance.

3. In a pulse generator, a transmission line having series inductance and shunt capacity, a load connected across the line at one end having impedance equal to the impedance of the line, means to produce equal charges of opposite polarity at alternate points spaced successively along said line, a switch, means responsive to operation of said switch to discharge said charges through said line whereby a wave is set up on said line traveling in each direction and dissipating itself in said impedance, and an oscillatory pulse is produced having a duration dependent on the electrical length of said line.

4. In a pulse generator, the combination of a filter comprising a series of filter sections, each comprising series inductance and shunt capacitance, means to charge alternate of said capacitances with like polarity and intermediate capacitances with opposite polarity, and means simultaneously to discharge all of said capacitances through adjacent portions of said inductances whereby an oscillatory wave is produced in said line having a frequency determined by the inductance and capacity of said sections and having a duration equal to the electrical length of said filter.

5. In a pulse generator, a line comprising a plurality of sections, each having series inductance and shunt capacity, an impedance across said line at each end matching the impedance of the line, a source of unidirectional electromotive force, means to connect the shunt capacity of all of the alternate sections of said line in series with the shunt capacity of all of the sections of said line intermediate said alternate sections across said source of electromotive force, means abruptly to short circuit all points on said capacitances between which said electromotive force is applied thereby to set up an oscillatory wave traveling in each direction in said line and dissipating in said impedances, said wave having a frequency determined by the constants of said sections and said wave forms a continuous pulse of duration dependent on the number of sections in said line.

6. In a pulse generator, the combination of a low pass filter comprising a plurality of series connected sections, each having series inductance and shunt capacitance, a load connected across one end of said line matching the impedance of said line, means to charge alternate of said capacitances with like polarity and intermediate of said capacitances with opposite polarity, and means simultaneously to discharge all of said capacitances through said inductances adjacent thereto whereby an oscillatory wave is produced in said line which travels along said line to said load and an oscillatory pulse appears across said load, successive sections of said line varying from one end of said line to the other in such a way that those portions of said wave which travel farthest in said line appear on said load with magnitude substantially equal to those portions which travel shortest in said line, thereby to increase the uniformity of intensity of said oscillations in said load throughout the duration of said pulse.

7. The combination, in a pulse generator, of a line comprising a plurality of sections each having an outer shield and a central conductor, the outer shield of alternate sections being connected together and to a terminal of a source of unidirectional electromotive force, the outer shield of sections intermediate said alternate sections being connected together and to the opposite terminal of said source of electromotive force but insulated from said shields of said first sections, a load connected across said line at one end for oscillations of the frequency determined by the series inductance and shunt capacitance of said line, and means abruptly to short circuit together the shields of all of said sections, thereby to produce in said load an oscillatory pulse having duration dependent on the length of said line, the oscillations of said pulse having said frequency.

8. The combination, a transmission line comprising a pair of conductors having distributed series inductance and shunt capacity, one of said conductors being divided into a plurality of parts, means to charge the capacitance between alternate points of said one conductor and the other conductor with one polarity and to charge the capacitance between the intermediate parts of said one conductor and said other conductor with the opposite polarity, means to connect the capacitance between said alternate parts of said one conductor in series with the capacity between adjacent parts of said one conductor and said other conductor across adjacent portions of said other conductor thereby to discharge said capacitances through the inductance of said other conductor and thereby to excite oscillation in said line, and a load impedance for said oscillations across said line at the end thereof.

9. The combination, a transmission line comprising a pair of conductors having distributed series inductance and shunt capacity, one of said conductors being divided into a plurality of parts, means to charge the capacitance between alternate points of said one conductor and the other conductor with one polarity and to charge the capacitance between the intermediate parts of said one conductor and said other conductor with the opposite polarity, means to connect the capacitance between said alternate parts of said one conductor in series with the capacity between intermediate parts of said one conductor and said other conductor across adjacent portions of said other conductor thereby to discharge said capacitances through the inductance of said other conductor and thereby to excite oscillation in said line of substantially square wave form, and a load impedance across said line on which said square wave appears, said parts in succession along said line having lengths proportioned in accord with the duration of corresponding portions of said square wave to be produced whereby said square wave may represent the dots and dashes of a telegraphic code.

10. A pulse generator comprising a plurality of series-connected impedances, means for energizing alternate ones of said series-connected impedances with electric charges in one polarity and intermediate ones of said impedances in the opposite polarity, and means for discharging said impedances into a load to produce an oscillatory pulse therein.

11. A pulse generator comprising a plurality of shunt-connected impedances, means for energizing alternate ones of said shunt-connected impedances with electric charges in one polarity and intermediate ones of said impedances in the opposite polarity, and means for discharging said impedances into a load to produce an oscillatory pulse therein.

12. In combination, a transmission line comprising a plurality of series-connected impedances, a load connected across said line, and means for causing current to flow in one direction through alternate ones of said impedances and in the opposite direction through intermediate ones of said impedances and thereby to cause an oscillatory pulse in said load.

13. A pulse generator comprising a series of first impedances and a plurality of second impedances of different nature from said first impedance coupled to said series of first impedances at different points along the length thereof, means for charging alternate ones of said second impedances with an electric charge of one polarity and intermediate ones of said second impedances with an electric charge of opposite polarity, and means simultaneously to discharge all of said second impedances through the first impedance section adjacent thereto.

14. The combination, in a pulse generator, of a line comprising a plurality of sections each having an outer shield and a central conductor, the outer shield of alternate sections being connected together and to a terminal of a source of a unidirectional electromotive source, the outer shield of sections intermediate said alternate sections being connected together and to the opposite terminal of said source of electromotive force but insulated from said shields of said first sections, a load connected across said line at one end, and means abruptly to short circuit together the shields of all said sections, thereby to produce in said load oscillatory pulses of substantially square waveform, said sections in succession along said line having lengths proportioned in accord with the duration of corresponding portions of said square wave to be produced.

15. The combination, a transmission line comprising a pair of conductors having distributed series inductance and shunt capacity, one of said conductors being divided into a plurality of parts, means to charge the capacitance between alternate points of said one conductor and the other conductor with an electric charge of one polarity and to charge the capacitance between the intermediate parts of said one conductor and said other conductor with the opposite polarity, means to connect the capacitance between said alternate parts of said one conductor in series with the capacity between adjacent parts of said one conductor and said other conductor across adjacent portions of said other conductor thereby to discharge said capacitances through the inductance of said other conductor and thereby to excite oscillation in said line of substantially square waveform, and a load impedance across said line on which said square wave appears, said parts in succession along said line having lengths proportioned in accord with the duration of corresponding portions of said square wave to be produced.

16. The combination, a line comprising a plurality of sections each having an outer shield and a central conductor, each of said sections being wound in a coil and having series inductance and shunt capacitance, the outer shield of alternate sections being in electrical contact with each other and the outer shield of sections intermediate said alternate sections being in electrical contact with each other but insulated from the outer shield of said alternate sections, means connecting the alternate and intermediate sections of said inner conductor in succession, means to charge the capacitance between said alternate sections of said outer shield and the central conductor with one polarity and to charge the capacitance between the intermediate sections of said outer shield and said inner conductor with the opposite polarity, means to connect the capacitance between said alternate sections of said outer shield in series with the capacitance between intermediate sections of said outer shield and said central conductor across adjacent sections of said central conductor thereby to discharge said capacitances through the inductance of said central conductor and thereby to excite oscillation in said line of substantially square waveform, and a load impedance across said line on which said square wave appears, said sections in succession along said line having length proportioned in accord with the duration of corresponding portions of said square wave to be produced.

References Cited in the file of this patent
UNITED STATES PATENTS
2,415,116   Stiefel _____ Feb. 4, 1947